United States Patent [19]

Elhaus

[11] 4,152,959

[45] May 8, 1979

[54] HOT SHEARING APPARATUS

[76] Inventor: Friedrich W. Elhaus, D-5600 Wuppertal Hofkamp, Fed. Rep. of Germany

[21] Appl. No.: 764,294

[22] Filed: Jan. 31, 1977

[30] Foreign Application Priority Data

Feb. 5, 1976 [DE] Fed. Rep. of Germany ....... 2604418

[51] Int. Cl.² .......................... B26D 5/38; B26D 7/06; B26D 5/12; B26D 3/16
[52] U.S. Cl. ........................................ 83/123; 83/198; 83/369; 83/372; 83/639
[58] Field of Search ................. 83/198, 123, 369, 370, 83/372, 639

[56] References Cited

U.S. PATENT DOCUMENTS

| | | | |
|---|---|---|---|
| 2,380,898 | 7/1945 | Pimentel | 83/198 |
| 3,348,441 | 10/1967 | Toney et al. | 83/198 X |
| 3,552,253 | 1/1971 | MacDonald | 83/372 |
| 3,886,829 | 6/1975 | Criblez | 83/198 |
| 3,972,257 | 8/1976 | Lazar | 83/198 |

*Primary Examiner*—Donald R. Schran
*Attorney, Agent, or Firm*—James B. Blanchard; Gary M. Ropski

[57] ABSTRACT

A hot shearing apparatus for shearing heated round or flat section bars or rods, in particular light metal bars, to obtain cut bars or billets comprises a drive unit, fixed and movable shearing members, a drive means for producing the shear forces, an abutment means, an ejector means, and a transfer means for the sheared billets. Shearing rings are used as the shearing members. The ratio of the diameter to the length of the shearing rings is greater than one. Thus the diameter is relatively large as compared to the length. This permits high quality cuts and, at the same time, trouble-free operation of the apparatus.

11 Claims, 8 Drawing Figures

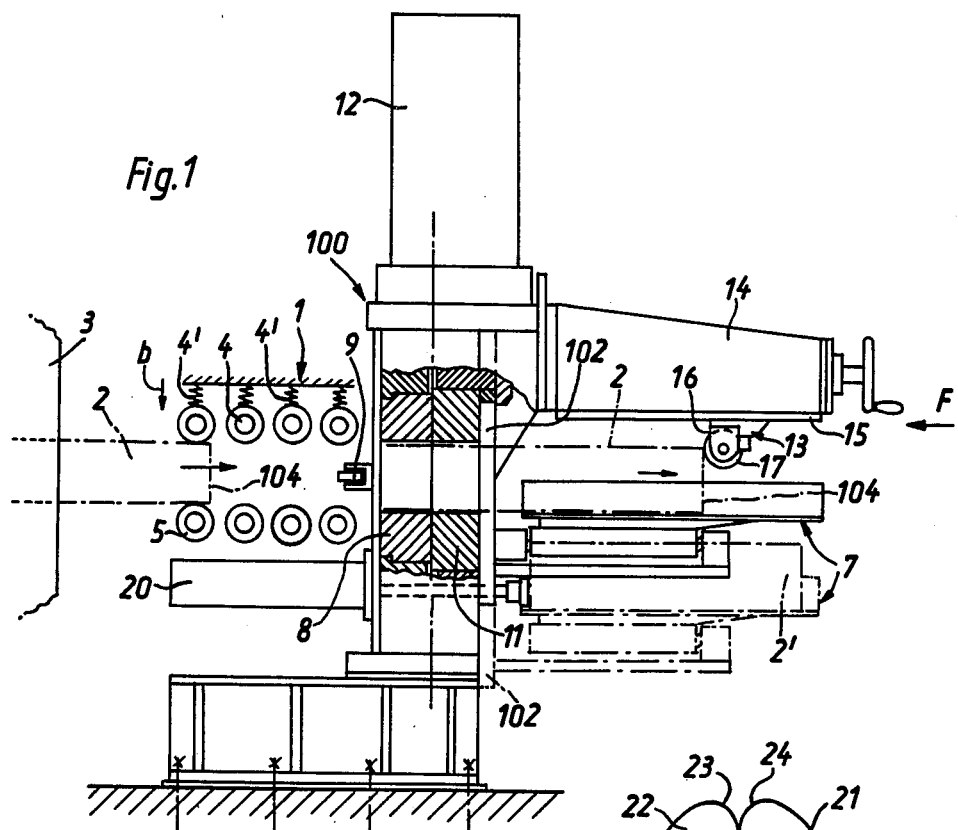
Fig.1
Fig.4
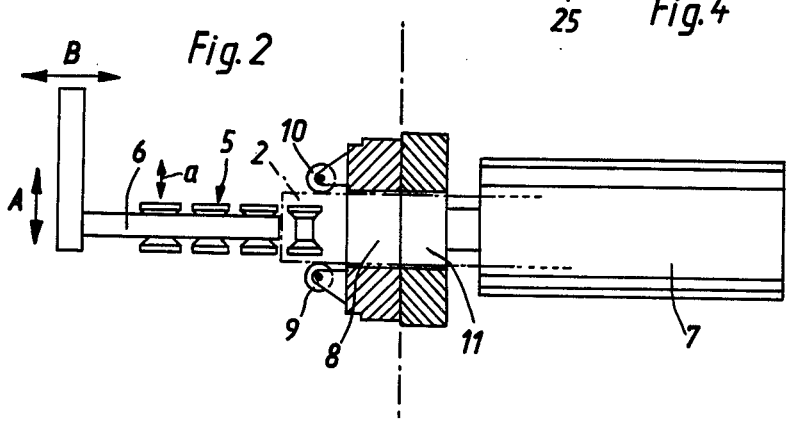
Fig.2

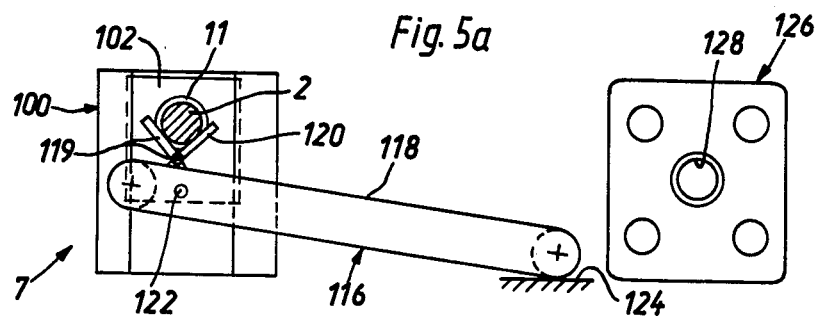
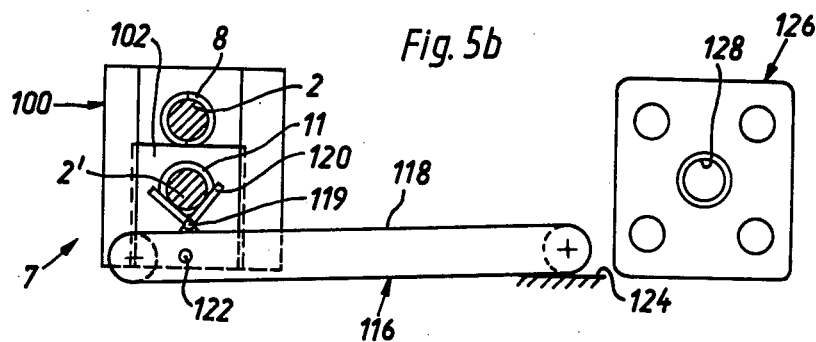
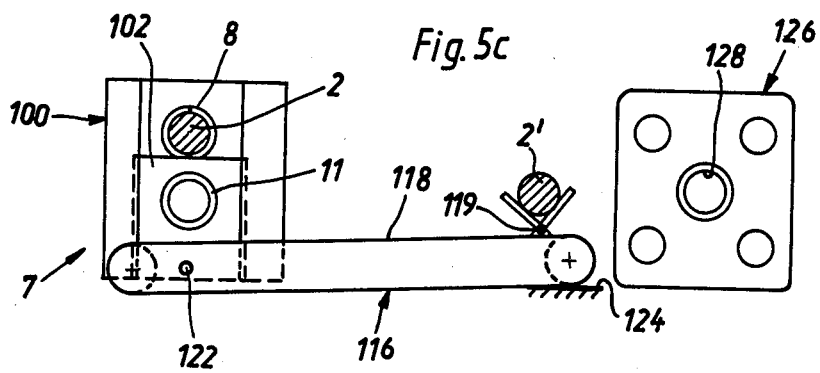
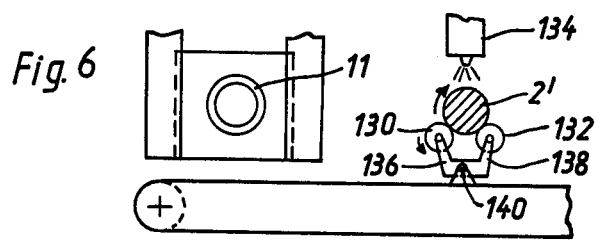

HOT SHEARING APPARATUS

Field of the Invention

The instant invention relates to a hot shearing apparatus for shearing heated round or flat section bars, in particular of light metal, in billets.

BACKGROUND OF THE INVENTION

Hot shearing devices of this kind in general are combined with plants for manufacture of hot-pressed or forged products from non-ferrous metals. For the production of pressed aluminum foils or sheet material, for instance, extruded aluminum rods are taken from store and placed in a heater unit where they are heated to a certain processing temperature and are subsequently transported to a hot shearing apparatus. In this hot shearing apparatus the heated rods are cut to certain lengths and then supplied to a molding machine, for example an extruder.

Billet hot shearing apparatus normally have a fixed front shearing bushing and a rear shearing bushing which is vertically movable, a transport means for advancing the rods into the shearing bushing and for returning the remainder of the rod into the heater unit, and an abutment means for limiting the advance and initiating the shearing process. Moreover, known hot shearing devices comprise hydraulic drive means to produce the shear forces, a receptacle for the sheared billets, and ejector and transfer devices for removing the sheared billets from the shearing apparatus. The known hot shearing apparatus for billets have disadvantages which greatly limit their field of application and availability. For instance, it is a disadvantage that the length of the shearing bushings is much greater than their diameter. This results in a great channel length which makes it likely for the billets, which are often curved or bent due to the heating, to contact the inner wall of the channel. Any such contact, however, causes friction which impairs the transportation. As the hot aluminum has a tendency to adhere firmly to the faces of the shearing bushings the transportation of the rods through the shearing bushings often is rendered so difficult that the rods can no longer pass through the bushing openings without trouble. In such cases the entire plant must be shut down and cleaned.

The inventor discovered that even a larger inner diameter of the bushings, by which the clearance between the billets or bars and the bushings would be enlarged, does not help to eliminate the above mentioned difficulties.

Contacting of the bushings walls, in particular by distorted billets or rods cannot be avoided by the selection of larger bushing diameters which are selected in accordance with the respective maximum curvature of the billets or rods because the billets or rods are deformed to such an extent during the first shearing that the larger parts of their circumference engages the inner wall of the bushing. Thus the clearance mentioned is eliminated for the second shearing already and for all further shearing processes to which the respective billet is subjected. Moreover, further serious disadvantages result from the choice of a larger inner diameter of the bushings. For instance, the inclination or tilting of the billets or rods with respect to the longitudinal axis during the shearing process will be the larger the larger the clearance between the diameters is chosen to be. This will produce an oblique cut, i.e. a cut which does not extend vertically to the longitudinal axis of the billet or rod. Furthermore, the diameter of the billet at the sheared end because more deformed by the upsetting of material in the case of a large clearance and becomes so enlarged that also the diameter of the recipient of the extruder or extrusion press for tubes must be selected to be so much larger. The resulting disadvantages regarding air pockets and reduced specific pressing forces are wellknown.

Known hot shearing devices for billets include abutment means which have sensor pins to release the shearing process when contacted by the billet end. The sensor pin may enter into the material of the billets or rods which was softened by the heating and may considerably obstruct the transverse displacement required during shearing of the billet sections to be severed. This may also result in abrasion or sticking of the pins, thus disturbing the proper functioning of the plant.

Another disadvantage of the known hot shearing apparatus resides in the lateral transfer of the billets which frequently consist of two rod rests from the hot shearing apparatus to the loading means of the press or to an intermediate station when the part sections of the billets are dumped to the side out of the take-up means.

SUMMARY OF THE INVENTION

It is an object of the invention to provide an improved hot shearing apparatus for billets with which the disadvantages mentioned are eliminated.

Another object of the invention resides in the provision of a hot shearing apparatus for billets which is hardly susceptible to trouble.

It is yet another object of the invention to provide a hot shearing apparatus which is suitable for processing even relatively crooked rods at good cutting quality and minor deformation.

Finally, it is also an object of the invention to provide a hot shearing apparatus with which the removal of the billets is simplified and trouble-free and also the transfer to another processing station, such as a press is simplified and trouble-free.

Therefore, the invention presents a hot shearing apparatus for shearing heated round or flat section bars, in particular of light metal, in billets, comprising a drive unit, a fixed and a movable shearing member, an abutment means, a drive means for producing the shear forces, a take-up means for the sheared billets, an ejector means, and a transfer means. The shearing elements are formed by shearing rings, the ratio between diameter and length of which is greater than one. Particularly advantageous are diameter: length ratios between 1.5 and 2.0 for round section aluminum billets. In practice the diameters of the shearing rings may be between 100 and 350 mm.

The selection of shearing rings having a small length as compared to the diameter, i.e. a small axial extension instead of shearing bushings which normally have a ratio between diameter and length which is greater than one, means that the channel surrounding the billet is short. This results in much better, almost frictionless passage even of distorted rods or billets. Furthermore, the overall structural length of the shearing apparatus may be smaller. Another essential advantage resides in the fact that the diameter tolerance between billet or bar and shearing rings can be selected to be extremely small so that the deformation of the billets by the shearing process can be kept within narrow limits.

The hot shearing apparatus according to the invention can be realized with undivided shearing rings. This embodiment, too, shows the full advantages of the apparatus according to the invention of high cutting quality and little susceptibility to disturbance because only a small clearance is provided between the shearing rings and the billets and yet the frequency of contacts between the billet and the internal wall of the shearing ring is greatly reduced because of the small axial length of the shearing rings.

However, in a preferred embodiment of the invention the stationary shearing ring or both shearing rings each have too shell halves, the separating lines of which extend in shearing direction. During the advance of the billet or rod the shell halves are drawn apart or spread at the top or bottom. This enlarges the take-up space in the shearing apparatus during the process of advance so that the chances that even distorted billets or rods will hit against a wall or become jarred are reduced still further. This preferred embodiment of the invention at the same time makes it possible to reduce the diameter tolerance between billets or rods and shearing rings still further.

Particularly advantageous is an embodiment with which only the fixed shearing ring is adapted to be spread, the diameter in spread position corresponding to the diameter of the movable shearing ring. Prior to the shearing process the spreading is cancelled so that the fixed shearing ring closely surrounds the billet. This almost entirely excludes any deformation of the rod end during the cutting procedure. After the shearing process the spreading is repeated so that a trouble-free return movement from the shearing apparatus into the heater unit is warranted.

The two shell halves can be spread by translatory motion or by swinging, advantageously in a vertical plane and with the aid of fluid cylinders. For instance, the shell halves may be hinged to each other at the top or bottom or their outer edges may be rounded off to form roll-of faces along which the shell halves may roll off during the swinging movement to open the shearing ring. At the opposite side the shell halves can be spread by pressure fluid cylinders.

According to another modification of the invention at least two opposed guide rollers designed at loose rollers are disposed at the entry end before the front shearing ring. They are arranged in a plane transversely of the shearing direction and the distance between them corresponds to the inner diameter of the shearing rings during the shearing process. These rollers serve or accurately aligning and introducing the rods into the shearing rings. As the smallest possible diameter tolerances are given between the rods and the shearing rings, these guide rollers make it possible to introduce the rods into the shearing rings without hitting against anything. By cooperating with a specific embodiment of the drive unit these guide rollers furthermore permit shearing of crooked rods without any problem. In accordance with the invention the drive unit is equipped with driven rollers supported so as to be movable in the direction of their longitudinal axis, and each being spring-loaded in vertical direction. By means of this "floating" support the rollers adapt to the curvatures of the rods during the process of advance so that any jamming of the heated material is avoided and instead it is transported without any trouble by means of these rollers.

The drive unit further comprises upper and lower guide rollers equipped with separate drive means. According to another embodiment of the invention the upper drive roller frame is arranged for tilting movement. In case any operational disturbance of the drive unit or of the shearing elements should occur, these areas of the hot shearing apparatus could be rendered easily accessible.

In accordance with another advantageous embodiment of the invention the abutment means of the hot shearing apparatus comprises a resiliently supported roll-lever which guaranties an exact abutment in longitudinal direction of the billets, accommodates the drift force generated during the shearing, and also initiates the shearing process by way of switching elements. Upon transverse displacement during the shearing process the roll which is as large and wide as possible rolls off along the front end face of the billet. This rolling process avoids friction so that the billet does not become canted and jammed during the shearing motion.

Another feature of the hot shearing apparatus in accordance with the invention resides in a block pusher for pushing sheared billets through the two aligned shearing rings. This block pusher operates in combination with the drive roller frame and is arranged parallel to the drive roller frame for such pivoting movement that it can be swung into the shearing axis. If necessary, a special control of the drive unit first moves the billet from the heater unit up to or into the shearing apparatus, then the block pusher is pivoted into the shearing axis and set into operation to push the billet through the shearing rings into the take-up means which will transport it to the press. By virtue of this arrangement the apparatus according to the invention can be used with billets which have already been subjected to shearing, without having to operate the hot shearing apparatus.

A particularly advantageous embodiment of the hot shearing apparatus according to the invention includes a transfer device which is designed to support the billets during the shearing process, to receive the sheared billets which are ejected out of the movable shearing ring, and to transport or transfer the sheared billet to the loading means of the press or to an intermediate station. This eliminates not only the separate transport device required with known hot shearing apparatus but also the lateral ejection, susceptible to trouble, of the billets out of the hot shearing apparatus into this separate transport device.

Conveniently the transfer device comprises a trough dimensioned so as to take up a sheared billet and connected to the run of a conveyor which in turn is pivotally connected to the shearing ring holder of the movable shearing ring so that it follows the upward and downward movement of the movable shearing ring. Before and during the shearing process or the ejection of the billets the trough is located in the shearing axis, aligned with the bore of the movable shearing ring. The trough can be moved toward the side or downwards out of the range of the hot shearing apparatus for transportation to the press or to an intermediate station. On its way to the loading means of the press the trough may stop at one or several stations, if required, where, for instance, the billets may be rotated by 180° about a vertical axis and/or the press disc may be allocated.

At an intermediate station chilling or cleaning may take place with the aid of the movable trough which is advantageously designed as a roller prism for this particular purpose and has at least one driven roller or as a basket which is rotatable about its longitudinal axis.

BRIEF DESCRIPTION OF THE DRAWING

In order that the invention may be clearly understood and readily carried into effect several embodiments will now be described, by way of example, with reference to the accompanying drawings, in which:

FIG. 1 is a lateral view, partly in section, of a billet hot shearing apparatus according to the invention, FIG. 2 is a top plan view, partly in section, of the hot shearing apparatus shown in FIG. 1, FIG. 4 is a diagrammatic top plan view of an embodiment of the stationary shearing ring, FIGS. 5a to 5c are diagrammatic views, taken in the direction of arrow F in FIG. 1, showing various phases of operation during shearing and transfer of a billet to a press, FIG. 6 is a view similar to FIG. 5c, showing a modified transfer device on an enlarged scale.

DESCRIPTION OF THE PREFERRED EMBODIMENTS

Figure 3:
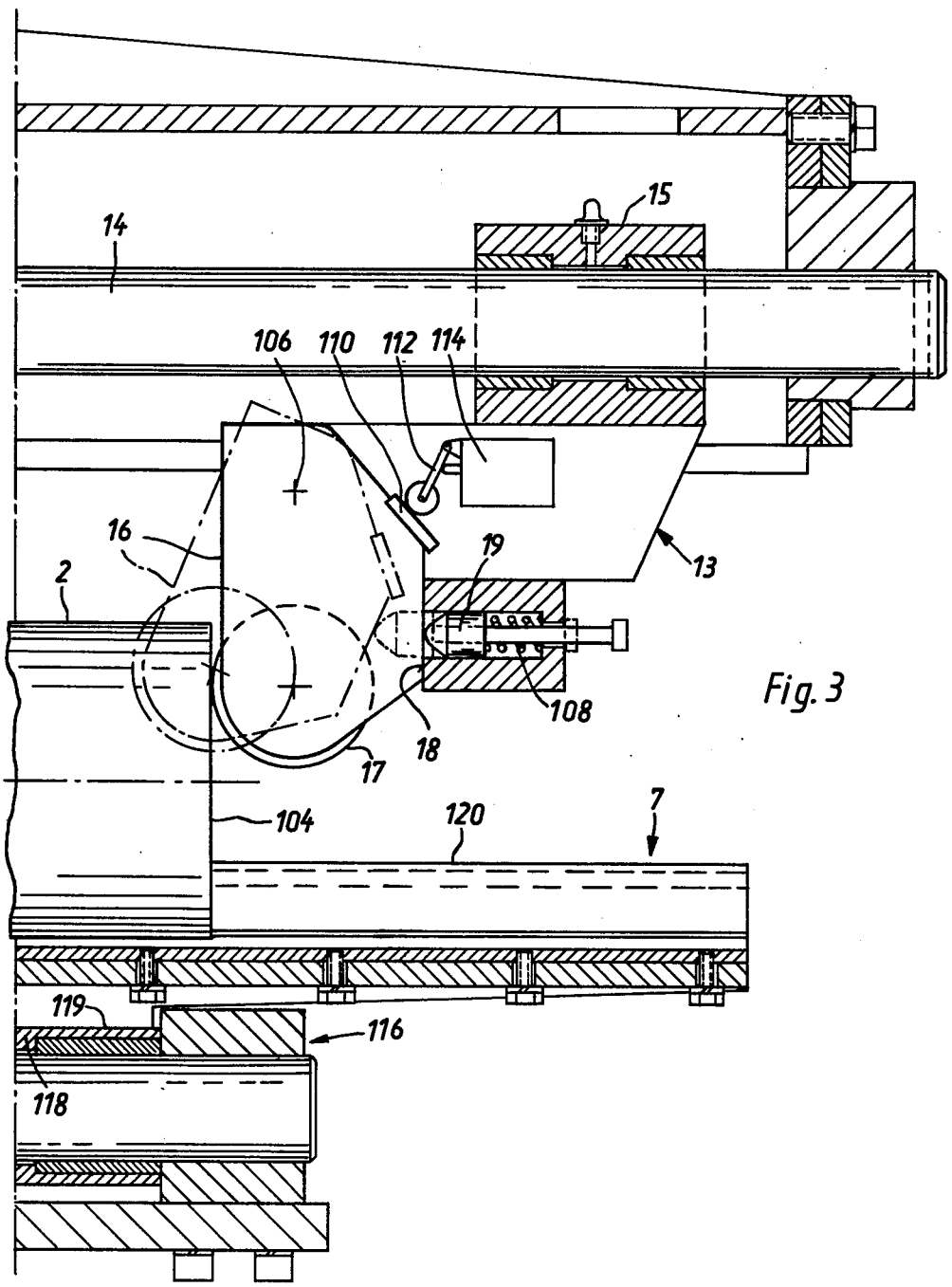
FIG. 3 is a sectional view, to an enlarged scale, of the transfer end of the hot shearing apparatus at the right hand side, as seen in FIGS. 1 and 2.

The shearing action of the hot shearing apparatus shown is from above. Of course, equivalent embodiments with shearing action in a different direction and correspondingly off-set elements are also embraced by the scope of the invention.

As will be seen from FIG. 1, the apparatus for hot shearing of billets comprises a drive unit 1 for conveying rods, bars, or billets 2 from a heater unit 3 through shearing rings 8, 11. The drive unit includes an upper set of drive rollers 4 and a lower set of drive rollers 5, the roller frame which supports the upper set of drive rollers being designed to be pivotal so that it can be moved, for instance, by an hydraulic means (not shown). The drive rollers are supported for horizontal displacement toward either side in the direction of the their longitudinal axis (arrow a in FIG. 2). Each of the upper drive rollers is loaded by a spring 4' (arrow b in FIG. 1). A block pusher 6 is adapted to be swung from its rest position next to the drive rollers in the direction of arrow A into a position between the sets of drive rollers 4, 5 so as to push the billets through the shearing rings 8, 11 in the direction of arrow B into a transfer device 7 (see FIG. 2).

Closely adjacent the drive unit 1 the fixed front shearing ring 8 is firmly supported in the shear housing 100. It is preceded in the direction of movement by two lateral guide rollers 9, 10. Adjacent the front shearing ring 8, in downstream direction, there is located the movable shearing ring 11 which is supported in a shearing ring holder 102 guided for vertical movement at the shear housing 100. Vertical shearing movement is transmitted to the shearing ring holder 102 from an hydraulic system 12, causing shearing ring 11 to be moved down from its position of alignment with the fixed shearing ring 8 into a position shown in discontinuous line in FIG. 1 with respect to the shearing ring holder.

It will be realized that the ratio of the diameter to the length of the shearing rings 8, 11 is greater than one.

The embodiment according to FIG. 4 shows the stationary shearing ring 8 sub-divided into two shell halves 21 and 22 by a vertical separating line which extends in the shearing direction. The upper edges 23 and 24 of said shell halves are designed as roll faces. Hydraulic cylinders 25 and 26 are connected laterally to the shell halves 21 and 22, respectively, to spread the shell halves 21, 22 of shearing ring 8 prior to the transport of the billets through the shearing rings 8, 11. The roll faces 23, 24 enable the shell halves to roll off on each other. Another even simpler embodiment (not shown) provides for the shell halves to be moved in translatory motion for spreading, thus becoming completely disengaged from the billet. Upon completion of the billet advance and prior to the shearing action the spreading is terminated so that shearing ring 8 closes once more, surrounding the billet. Shearing ring 8 may have a smaller diameter than shearing ring 11 so that, in closed position, it will embrace the billet with but small running clearance.

The shearing action is initiated by an abutment means generally designated 13 in FIGS. 1 and 3. The leading face 104 of the billet 2 to be subjected to shearing runs up against this abutment means 13. As the abutment means 13 is guided on a guide bar 14 by means of a displaceable carriage 15 adapted to be fixed, the length of the billets to be cut is variable. The abutment means 13 includes a lever 16 which is pivotal about pivot point 106 at the abutment means 13 and carries a roll 17 at its free end. In unloaded condition this roll-lever 16 is urged to the left as seen in FIG. 3, i.e. toward the shearing rings 8, 11, by a spring 108 acting through a pin 19. The lever 16 further includes a stop member 110 for cooperation with the sensor 112 of a limit switch 114.

When a bar 2 to be sheared is pushed through the shearing rings 8, 11, its front end face 104 hits the roll 17 of lever 16 and pushes the lever against the force of spring 108 until a fixed stop 18 of the abutment means 13 is reached. At the same time the sensor 112 of limit switch 114 is moved into its contacting position, whereby the shearing process is released. During shearing, the billet 2 is moved downwardly transversely of its longitudinal direction, in other words it is taken along downwards by the transfer device 7 so that roll 17 rolls off along the front end face 104 of the billet without causing any friction. When roll 17 has been released by front end face 104, lever 16 again adopts its original position, shown in discontinuous line in FIG. 3, under the action of spring 108.

The transfer device 7 includes a conveyor 116 and a trough 112 which is secured at 119 to the belt or chain 118 of the conveyor and serves to receive a sheared billet 2'. The conveyor 116 is connected firmly or pivotally or by a stop with the movable shearing ring holder 102 of shearing ring 11. In the case of the embodiment shown this connection between the conveyor 116 and the shearing ring holder 102 is pivotal and established by a pin 122 which pivotally supports the conveyor 116 such that its one end moves down during the shearing action together with the shearing ring holder 102, with its other end carries out a horizontal reciprocating motion.

At the beginning of the shearing process bar 2 is in the upper position shown in FIG. 5a, with shearing rings 8, 11 in alignment. During shearing the bar 2' is moved in vertical direction until it reaches its lowermost position, shown in FIG. 5b, in which it is completely sheared. As follows from FIG. 5b, conveyor 116 has been swung about a support 124 which permits and guides rectilinear movement of the ring end of the conveyor. This ring end is located adjacent a press 126, the recipient 128 of which is designed so as to take up a billet 2. The phase illustrated in FIG. 5b is also shown in dash-dot lines in FIG. 1.

When the sheared billet 2' is in its lowermost position shown in FIG. 5b an ejector device 20 (FIG. 1) serves to push it fully out of shearing ring 11 into its transfer position in trough 120. Then the conveyor 116 is actuated by a drive means (not shown) so that the belt 118 will take along the trough 120 with the billet 2' to the loading means (not shown) of press 126 or to any intermediate station, likewise not shown. This phase is illustrated in FIG. 5c.

If necessary, the conveyor chain may be stopped at one or several stations between the hot shearing apparatus and the press 126 so as to turn the longitudinal axis of the billet by 180° in per se known manner and/or allocate the press disc. It is also possible to provide for chilling or cleaning of the billets at an intermediate station. Conveniently the billet 2' is turned in the trough during such procedure. To this end the modified embodiment shown in FIG. 6 comprises a trough formed by two rollers 130, 132 to permit the rotary motion of the billet. At least one of said rollers is adapted to be driven and rotate the billet 2' by its own rotation so that the billet can be chilled and cleaned uniformly by means of a spray and brush assembly 134. The rollers are pivotally supported by carrier arms 136, 138 forming knees and being pivotal in common about a bearing means 140 so that the rollers 130, 132 will always adopt the same angular position with respect to the billet, regardless of the pivot position of the conveyor 116. Thus the rollers can safely support the billet also during rotation thereof.

It will be understood that while the invention has been shown and described in a preferred form, changes may be made without departing from the scope of the invention as defined in the following claims.

What is claimed is:

1. A hot shearing apparatus for shearing heated bars in billets, comprising:
    a drive unit for advancing the billets;
    a fixed shearing ring and a movable shearing ring, said rings each having a diameter to length ratio which is greater than one, and said rings each including two shell halves;
    means for spreading the shell halves of the fixed and movable shearing rings in a direction substantially transversely to the shearing motion thereby facilitating movement of the billet into and out of the shearing rings; drive means for producing the shear forces; abutment means for the billets; ejector means for the sheared billets; and transfer means for the sheared billets.

2. Apparatus as claimed in claim 1, wherein the diameter:length ratio of the shearing rings is between 1.5 and 2.0.

3. Apparatus as claimed in claim 1, wherein two guide rollers are arranged laterally in the zone of the entry opening of the front shearing ring in a plane which extends transversely to the shearing plane.

4. Apparatus as claimed in claim 1, wherein the drive unit includes drive rollers which are floatingly supported in a direction transversely to the direction of advance of the billet.

5. Apparatus as claimed in claim 4, wherein the drive unit includes a block pusher which acts parallel to the path of the drive rollers and is arranged so as to be swung into the shear axis.

6. Apparatus as claimed in claim 1, wherein the abutment means includes pivotal roll-lever adapted to be pressed, by spring action, against the front end face of the billet for mechanical limitation of the billet advance and for release of the shearing process by means of a control switch, a roll being arranged at the free end of the roll-lever for rolling off the front end face of the billet during the billet shearing movement.

7. Apparatus as claimed in claim 1, wherein the transfer means includes a trough dimensioned to take up a sheared billet and connected to a conveyor means, and wherein the conveyor means is connected to a holder for the movable shearing ring.

8. Apparatus as claimed in claim 7, wherein the trough is pivotally connected with the shearing ring holder and is always held in the same angular position with respect to the shearing ring holder.

9. Apparatus as claimed in claim 7 wherein the trough includes a roller means having parallel rollers which form a take-up gap for the sheared billet and wherein at least one of the rollers is adapted to be driven.

10. Apparatus as claimed in claim 1 wherein the transfer means for the sheared billets is designed both for reception and transport of the billets from the hot shearing apparatus to a work station.

11. A hot shearing apparatus for shearing heated bars in billets, comprising:
    a drive unit for advancing the billets;
    a fixed shearing ring and a movable shearing ring, said rings each having a diameter to length ratio which is greater than one, and at least the fixed shearing ring including two shell halves;
    means for spreading at least the fixed shearing ring shell halves in a direction substantially transversely to the shearing motion thereby facilitating movement of the billet into and out of the shearing ring;
    drive means for producing the shear forces;
    abutment means for the billets;
    ejector means for the sheared billets; and
    transfer means for the sheared billets.

* * * * *

UNITED STATES PATENT AND TRADEMARK OFFICE
CERTIFICATE OF CORRECTION

PATENT NO. : 4,152,959
DATED : May 8, 1979
INVENTOR(S) : Friedrich W. Elhaus

It is certified that error appears in the above-identified patent and that said Letters Patent are hereby corrected as shown below:

Column 1, line 15, "until" should be --unit--

Column 1, line 52, "bushings" should be --bushing--

Column 2, line 3, "because" should be --becomes--

Column 2, line 9, "wellknown" should be --well-known--

Column 3, line 45 "at" should be --as--

Column 3, line 50 "or" should be --for--

Column 5, line 40, "axis" should be --axes--

Column 6, line 54, "with" second occurrence should be -- while --

Column 6, line 64, "ring" should be --right--

Column 6, line 65, "ring" should be --right--

Signed and Sealed this

Fourth Day of December 1979

[SEAL]

Attest:

SIDNEY A. DIAMOND

Attesting Officer

Commissioner of Patents and Trademarks